UNITED STATES PATENT OFFICE.

WILLIAM CHITTENDEN TAYLOR, OF CORNING, NEW YORK, ASSIGNOR TO CORNING GLASS WORKS, OF CORNING, NEW YORK, A CORPORATION OF NEW YORK.

GLASS.

1,414,715.

Specification of Letters Patent. Patented May 2, 1922.

No Drawing. Application filed December 15, 1920. Serial No. 431,009.

*To all whom it may concern:*

Be it known that I, WILLIAM CHITTENDEN TAYLOR, a citizen of the United States of America, and a resident of Corning, New York, have invented certain new and useful Improvements in Glass, of which the following is a specification.

It has been heretofore proposed to use cerium compounds in a glass to increase the absorption of the latter to the ultra-violet, but such compounds, when used in the glass compositions before suggested for that purpose in quantities sufficient to give a strong and effective cut-off produce a yellow tint, or cut down the transmission of the visible light.

My invention has for its object to provide a glass having a strong cut-off for the ultra-violet, and containing cerium dioxide, but of a pleasing flesh tint in pieces of considerable thickness.

I have found that this can be best accomplished by using a glass containing substantial quantities of potash, the potash tending to reduce the yellow coloration due to cerium oxide when used in a soda glass, and by adding a small percentage of manganese dioxide.

The following is a specific example of a glass batch falling within this invention:—

| | Per cent. |
|---|---|
| $SiO_2$ (silica) | 70. |
| $K_2O$ (potash) | 8.00 |
| $Na_2O$ (soda) | 11.8 |
| CaO (lime) | 5.5 |
| $CeO_2$ (cerium dioxide) | 4.5 |
| $MnO_2$ (manganese dioxide) | 0.2 |

It will be understood that the amount of manganese dioxide given in the above formula is approximate for as well known the amount of decolorization produced by this material is dependent on melting conditions.

The glass resulting from the above batch is flesh tinted, and has a very high ultra-violet absorption, transmitting less than 1% of wave lengths of 355 microns and less, and having a high transmission for the visible.

I have found that the general result had in view, can be obtained by using between three and six per cent cerium dioxide. The use of more than the last named amounts of cerium dioxide results in too great an absorption of the visible and prevents the development of the pink tint by the manganese.

Having thus described the invention, what I claim, and desire to secure by Letters Patent is:—

1. A flesh colored glass of high ultra-violet absorption and good visible transmission containing between 3 and 6 per cent cerium dioxide, and containing manganese dioxide.

2. A glass of high ultra-violet absorption and good visible transmission containing potash in substantial quantities, and cerium dioxide.

3. A glass of high ultra-violet absorption of good visible transmission, containing substantial quantities of potash, and between 3 and 6 per cent of cerium dioxide.

WILLIAM CHITTENDEN TAYLOR.